No. 839,827. PATENTED JAN. 1, 1907.
W. A. EDGIN.
COTTON THINNING PLOW.
APPLICATION FILED JULY 13, 1906.

WITNESSES:

William A. Edgin,
INVENTOR.
By C. A. Snow & Co.
ATTORNEYS

UNITED STATES PATENT OFFICE.

WILLIAM ALAXANDER EDGIN, OF GRAFORD, TEXAS.

COTTON-THINNING PLOW.

No. 839,827.  Specification of Letters Patent.  Patented Jan. 1, 1907.

Application filed July 13, 1906. Serial No. 326,113.

*To all whom it may concern:*

Be it known that I, WILLIAM ALAXANDER EDGIN, a citizen of the United States, residing at Graford, in the county of Palo Pinto and State of Texas, have invented a new and useful Cotton-Thinning Plow, of which the following is a specification.

This invention has relation to cotton-thinning plows; and it consists in the novel construction and arrangement of its parts, as hereinafter shown and described.

The object of the invention is to provide a plow adapted to be drawn across the fields of cotton in directions transverse to those in which the rows of cotton extend. The plows are spaced apart, and such plants as pass between such space remain, while those that are engaged by the blades of the plow are cut and destroyed. In advance of each plow-point is a colter-wheel. The said wheels are spaced apart correspondingly to the spacing between the said plows. The said wheels are adapted to cut into the earth, and thereby afford an incision which is followed by the plows, and consequently the earth bearing the roots of the plant intended to be preserved is not unnecessarily distributed or agitated.

Figure 1:
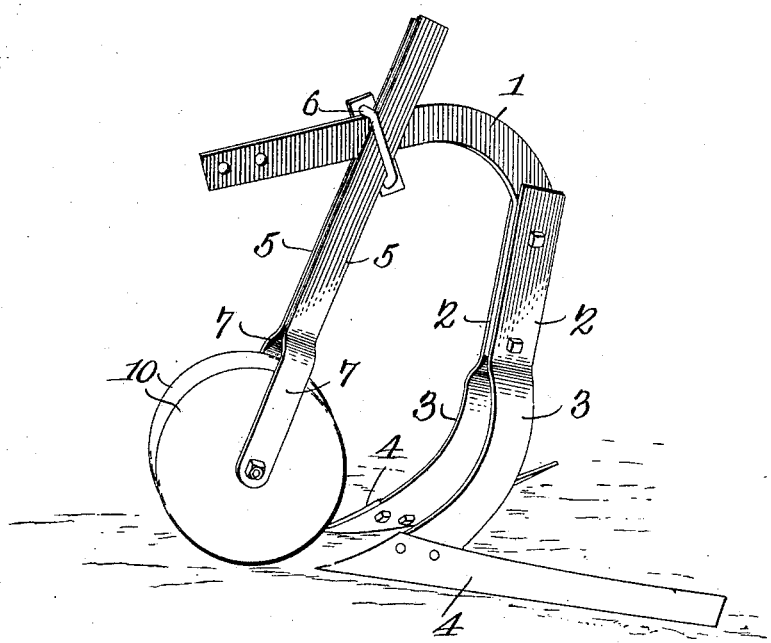
Figure 2:
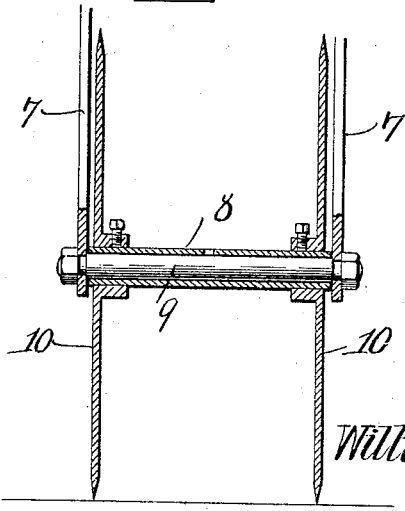

In the accompanying drawings, Figure 1 is a perspective view of the plow. Fig. 2 is a vertical sectional view of the colter-wheels carried by the plow.

The plow consists of the beam 1, to the rear end of which is bolted the plow-standards 2 2. The said standards at their lower portions are bowed outwardly, as at 3, and at the lower ends of said portions 3 are located the cutting-blades 4 4. Said blades are pointed at their forward ends and are provided with substantially horizontally forward cutting edges. The said cutting edges are adapted to engage the roots of the plants and sever and destroy the same.

The colter-standards 5 are clamped to the beam 1 by means of the U-shaped clamp-bolt 6. The said standards 5 are also provided at their lower ends with the bowed portions 7 7. The sleeve 8 is transversely supported at the lower ends of the standards 5 5 and is retained in position upon the ends thereof by means of the bolt 9, which is secured at its ends to the lower ends of the said standards 5 5. The sleeve is journaled upon the bolt 9. The colter-wheels 10 10 are fixed to the sleeve 8. The said wheels 10 10 are spaced apart, and one wheel 10 is located directly in advance of the point of the blade 4—that is to say, lines drawn from the point of a blade through the vertical axis of the colter-wheel in front of the same are parallel to a line similarly drawn from the opposite blade to the opposite colter-wheel.

From the foregoing description it is obvious that as the implement is drawn over the field of cotton in a direction transverse to that in which the rows of plants extend the blades 4 will cut the roots of the plants at intervals as they pass across the rows of cotton and that such plants as occur in the row between the pointed ends of the said blades 4 4 are not disturbed. The colter-wheels 10 traveling in advance of the said blades cut incisions in the soil and also sever in a vertical direction the roots of the plants, so that the said roots are not pulled laterally by the blades 4, and consequently the earth about the roots intended to be preserved is not unnecessarily agitated or disturbed.

Having described my invention, what I claim as new, and desire to secure by Letters Patent of the United States, is—

1. A cotton-thinning plow consisting of a beam, standards attached to said beam and having their lower ends spaced apart, cutting-blades attached to said standards, colter-standards attached to the beam in advance of the blade-standards, a bolt connecting said colter-standards together, a sleeve journaled upon said bolt, and colter-wheels fixed to said sleeve.

2. A cotton-thinning plow consisting of a beam, standards attached to said beams and having their lower ends spaced apart, cutting-blades attached to said standards, colter-standards attached to the beam in advance of the blade-standards, a bolt connecting said colter-standards together, a sleeve journaled upon said bolt and bearing at its ends against the colter-standards and colter-wheels fixed to said sleeve.

3. A cotton-thinning plow consisting of a beam, standards attached to said beam and having their lower ends spaced apart, cutting-blades attached to said standards, colter-standards attached to the beam in advance of the blade-standards, a bolt connecting said colter - standards together, a sleeve journaled upon said bolt and being retained against longitudinal movement thereon and colter-wheels located upon the sleeve and being capable of lateral adjustment thereon.

In testimony that I claim the foregoing as my own I have hereto affixed my signature in the presence of two witnesses.

WILLIAM ALAXANDER EDGIN.

Witnesses:
B. N. MADDOX,
J. A. CASTLEMAN.